United States Patent [19]
Close

[11] 3,823,824
[45] July 16, 1974

[54] PORTABLE DRINKING WATER PURIFIER

[76] Inventor: Sam Close, R.R. No. 5, Lebanon, Ind. 46052

[22] Filed: Sept. 21, 1972

[21] Appl. No.: 291,006

[52] U.S. Cl. ............... 210/86, 210/94, 210/248, 210/282
[51] Int. Cl. ............................................. B01d 35/00
[58] Field of Search ........... 210/86, 90, 94, 95, 248, 210/266, 282, 289, 130; 222/215

[56] References Cited
UNITED STATES PATENTS

| | | | |
|---|---|---|---|
| 324,622 | 8/1885 | Wheelock | 210/266 |
| 1,168,544 | 1/1916 | Newlin | 210/474 |
| 1,475,577 | 11/1923 | Green | 210/248 |
| 2,638,581 | 5/1953 | Marvel | 210/130 X |
| 2,761,833 | 9/1956 | Ward | 210/282 X |
| 2,827,172 | 3/1958 | Frazier | 210/252 X |
| 3,298,522 | 1/1967 | Muller | 210/90 |
| 3,390,821 | 7/1968 | Mullan | 222/215 |
| 3,630,683 | 12/1971 | Robb | 210/282 X |

*Primary Examiner*—Charles N. Hart
*Assistant Examiner*—Robert G. Mukai
*Attorney, Agent, or Firm*—Hood & Coffee

[57] ABSTRACT

For use with an adjustable flow faucet including a delivery port and a manually adjustable control valve, a portable disposable water filter comprising a housing having an inlet end portion and an opposite discharge end portion, and a filtering medium disposed between the end portions and through which the water must pass in movement from the inlet end portion to the discharge end portion. The inlet end portion is formed to provide a space for receiving water to be filtered, and this space is connected to the faucet delivery port. A device for visually indicating when the water pressure in the said space is at a predetermined level corresponding to the desired flow rate through the filtering medium is provided. This visual indicating device preferably is proportioned and designed to exhaust excessive unfiltered water away from the space to reduce the water pressure in the space to the desired level and/or to maintain it at or below that level. In one embdiment of the invention, the space above the filtering medium is an open container into which the water to be filtered may be deposited. In another embodiment, the water is deposited in a collapsible container, and the container is collapsed to move the water through the filtering medium.

14 Claims, 10 Drawing Figures

PATENTED JUL 16 1974 3,823,824

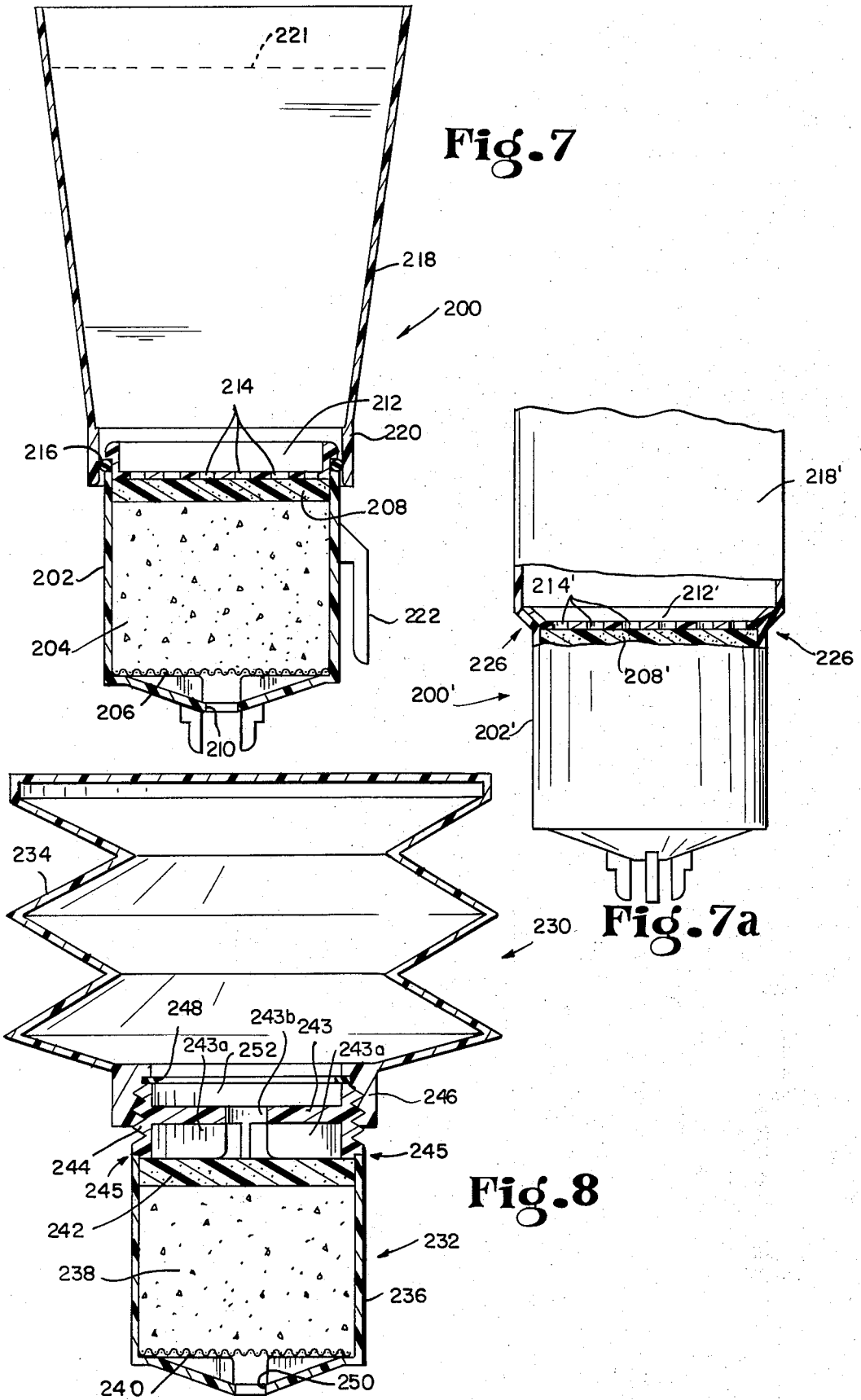

PORTABLE DRINKING WATER PURIFIER

It is a primary object of my present invention to provide a portable water filter which is extremely effective for the purpose of improving the taste, odor and color of drinking water, but which is inexpensively constructed so that it may be economically treated as a disposable filter.

Water filters, some times called water purifiers, are very well known. Water provided by municipal water systems, quite commonly, is extremely objectionable from a taste and odor standpoint. This is because it is conventional to add chemicals to the water in the purification process. Such chemicals make the water rather unpalatable to many people. It is desirable to remove objectionable tastes, odors, colorants and suspended matter causing cloudiness from water, particularly when the water is to be used for drinking or making coffee or tea.

Further, it is well known that water which has been "purified" in municipal plants can be treated to remove the objectionable tastes, odors, colorants, and suspended matter by passing the water through a filtering medium including activated charcoal. There are many proposals for accomplishing this purpose. Some proposals, including those of my own as represented by my United States patent applications Ser. Nos. 131,304 filed Apr. 5, 1971 and 131,308 filed Apr. 5, 1971, now U.S. Pat. No. 3,684,100 involve placing a rather large filtering system in the water supply line. Such systems are, of course, relatively expensive. Since usually only a small portion of the water being used is for drinking and cooking purposes, it may not be economically feasible for many persons to pass all of the water through such a filtering system.

It is an object of my invention, therefore, to provide a filtering or purifying unit which is so inexpensive that it can economically be a "throw-away item" after it becomes ineffective. Importantly, my filters differ from the prior art filters which have disposable filter cartridges, i.e., filter housings which split to permit the filter bed to be replaced with a clean, fresh filter bed. My filters are constructed such that, once the filter bed becomes ineffective for treating the water, the entire assembly may be disposed of.

My filters may well be sold to travelers who find that they cannot drink the water in locations in which they are traveling. My filters may be used by campers who treat their water with chemicals as a precautionary measure. Such campers might obtain a quantity of water, place chemicals in the water to purify it, and then pass the water through my filter to make it palatable and odorless to provide drinking and cooking water.

One of the problems with smaller filters available on the market is that they do not include adequate means for establishing and controlling the flow rate of the water through the filtering medium. It is the retention time of the water in the filtering medium, and particularly in the activated charcoal, which determines the amount of filtering that will be accomplished. If the retention time is too short, the water will not be properly treated.

The flow rate is established by the pressure on the water at the entry end or inlet end of the filtering unit. I have constructed my filters so that the water is collected in a space in advance of the filtering medium. Then, my filters include means for visually indicating when the pressure in that space is at and/or above a predetermined level corresponding to the desired flow rate through the filtering medium. My preferred visual indicating means includes means for exhausting excessive unfiltered water away from the space to reduce the water pressure in the space. The exhausting means is disposed such that the exhausted excessive water is not mixed with the filtered water discharged from the discharge end of the filter. This is an extremely important feature of my filters.

Particularly, I have provided means for exhausting excessive unfiltered water away from the collection space in advance of the filtering medium to reduce the water pressure in that space to the desired level and to keep it at or below that level. In this manner, I control the pressure in that space and the flow rate of the water through the filtering medium. The manner in which I do this and the reasons why I do it will become apparent as this description progresses.

Other objects and features of my present invention will become apparent as this description progresses.

To the accomplishment of the above and related objects, this invention may be embodied in the forms illustrated in the accompanying drawings, attention being called to the fact, however, that the drawings are illustrative only and that change may be made in the specific constructions illustrated and described, so long as the scope of the appended claims is not violated.

In the drawings:

FIG. 7 is an elevational view of another embodiment of my filter assembly including a removable open-topped receptacle defining the space above the filtering medium;

FIG. 7a is a structure similar to FIG. 7 except that the receptacle for receiving the water is integrally formed with the housing for the filter bed; and FIG. 8 is an elevational view of another embodiment of my filter assembly in which the receptacle for receiving the water is a collapsible container.

Figure 2:
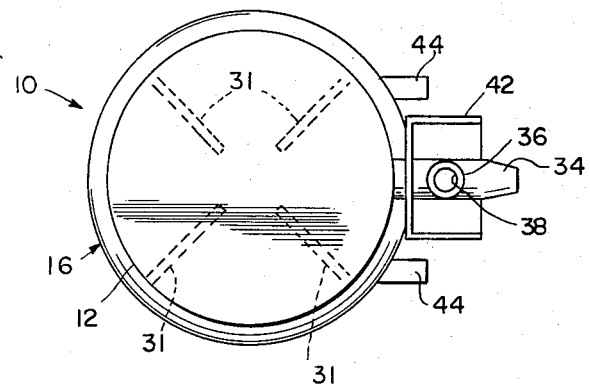
FIG. 2 is a plan view of the filter assembly of FIG. 1.
Figure 1A:
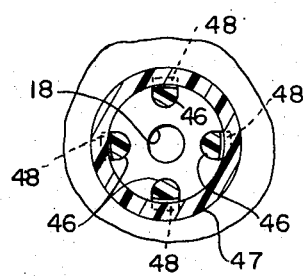
FIG. 1a is a sectional view taken along the lines 1a—1a in FIG. 1.
Figure 1:
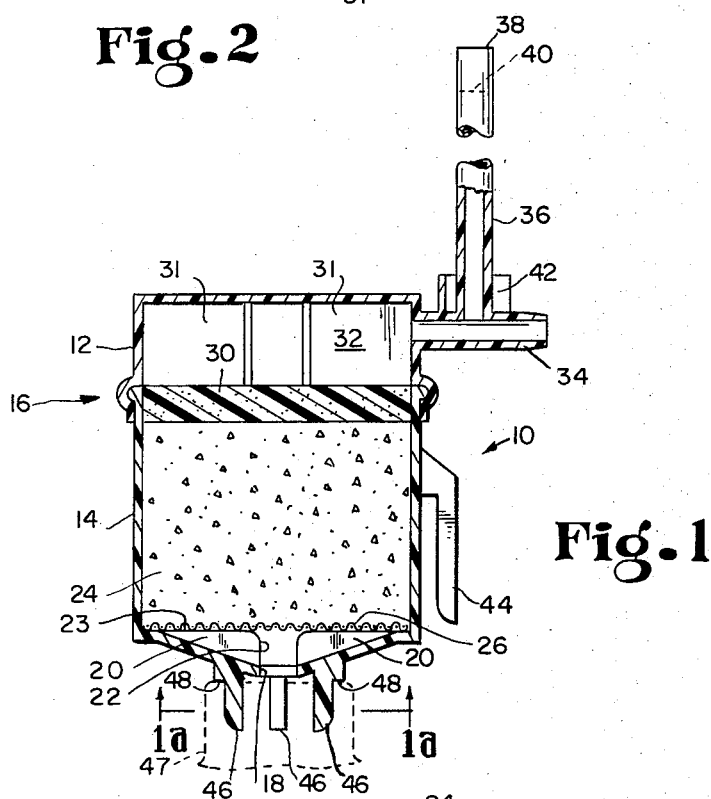
FIG. 1 is an elevational sectional view of a filter assembly constructed in accordance with my present invention, showing the filter assembly discharging water into the neck of a collection hug.

Turning now to the drawings and particularly to FIGS. 1, 1a and 2, I shall discuss the first of my preferred embodiments. In FIGS. 1 and 2, the filter assembly is indicated generally by the reference numeral 10, and includes a housing or casing provided by an upper housing portion 12 and a lower housing portion 14 connected together as indicated generally by the reference numeral 16. The connection indicated at 16 may be a snap-type connection or it may preferably be a permanent, ultrasonically bonded or adhesively bonded connection. Since it is an object of my invention to provide an inexpensive filter which may be disposable, it may be advisable simply to bond the two casing halves 12, 14 together permanently and to throw away the whole filter assembly 10 when the assembly becomes ineffective as a filter, i.e., the carbon is spent. It will be appreciated by those familiar with the art of assembling molded plastic items that the snap-type connection indicated at 16 will greatly facilitate the assembly operation, even if it is subsequently permanently bonded.

The filtered water is discharged from the assembly 10 through a discharge opening 18 at the bottom or discharge end portion of the housing. About this opening 18 and within the housing are radially extending ribs 20, the radially inner edges 22 of which are disposed about the periphery of the opening 18 and the upper edges 23 of which provide a platform for the carbon bed 24. Preferably, there is a carbon retainer 26 supporting the carbon bed 24 on the edges 23. This retainer 26 may be, for instance, a polyethylene woven fiber retainer which will pass water therethrough but which will retain the carbon particles. Any number of types of carbon retainer material may be used at the bottom of the bed of carbon. Further, it may be advisable somehow securely to engage the outer peripheral edge of the carbon retainer 26 with the inner peripheral surface of the casing portion 14 to prevent carbon fines from moving past the retainer. This may be done, for instance, using conventional bonding techniques such as adhesive bonding techniques or ultrasonic bonding techniques. It may also be donw by forming the housing portion 14 with a peripherally extending groove for receiving a retainer ring which clamps the outer peripheral edge of the retainer 26.

A primary requirement for the carbon retainer 26 is that it shall not become clogged by the "fines" which are washed from the carbon onto the retainer.

Another carbon retainer and prefilter 30 is desposed at the top of the carbon bed 24. This prefilter and retainer 30 may preferably be a compressible and porous, sponge-like prefiltering element. It is desirable to have a compressible prefilter element which will expand if the carbon bed 24 settles because of transportation shaking, temperature changes and the like. The prefilter material material may be, for instance, a foam plastic, open cell polyurethane, polyethylene, or the like. In the illustrative embodiment, the prefilter 30 is held in position and compressed by a plurality of radially extending ribs 31 extending downwardly from the upper wall of the housing portion 12.

Figure 3:
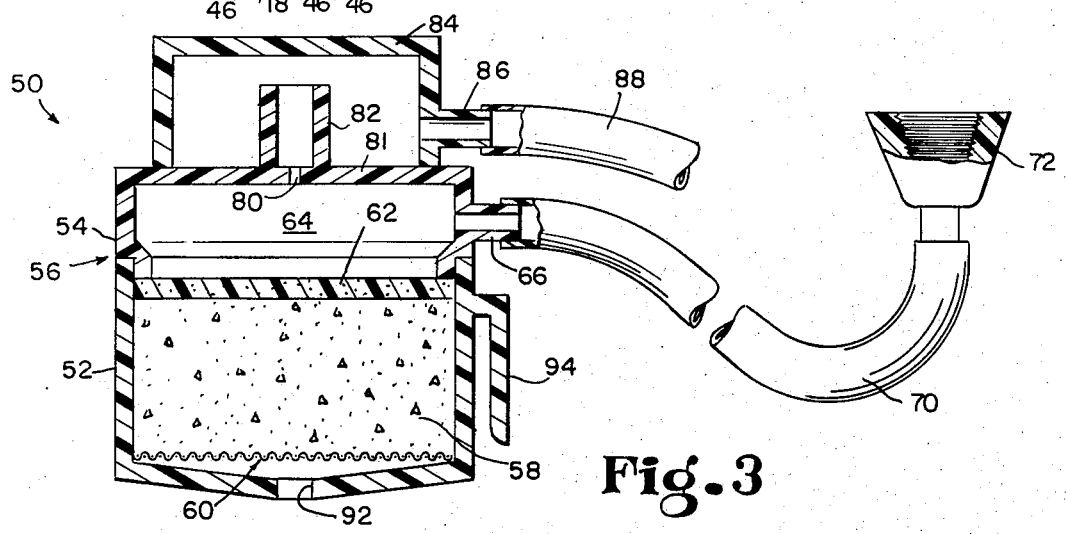
FIG. 3 is an elevational sectional view of another filter assembly embodiment of my present invention.

It will be seen that the space above the prefilter 30 in the housing is indicated generally by the reference numeral 32. Water is introduced into this space through an inlet tube 34 from which extends a stand pipe 36 which preferably is of at least partially clear plastic material. The top end 38 of this stand pipe 36 is open so that the water can flow out the top end. There is a score line 40 which may be etched or scribed or painted on the stand pipe 36 as indicia means for establishing the desired water level in the stand pipe. The water overflowing from the stand pipe falls into a trough 42 which may be integrally formed with the tube 34. The trough is proportioned and designed so that the water collected therein runs into a sink or other receptacle. The inlet tube 34 may be connected to an adjustable flow faucet of the type including a delivery port and a manually adjustable control valve. Such connection tubes are well known and one such tube is illustrated in FIG. 3.

Clips, such as indicated by the reference numeral 44, may be integrally formed on the housing portion 14 so that the filter assembly 10 may be clipped to the side of a pitcher or some other such receptacle. Further, the lower portion 14 of the housing may be provided with a plurality of integrally formed downwardly extending prongs 46 peripherally spaced about the opening 18. These prongs 46 extend downwardly into and engage the neck of a jug (shown in phantom and indicated by the reference numeral 47 in FIG. 1). The prongs 46 are proportioned and designed such that, when their radially outwardly extending abutment portions 48 are engaged with the lip of the jug 47, there are air spaces between the prongs and above the lip of the jug. When the jug is being filled with filtered water, air can escape from the jug through these air spaces and water can overflow from the jug through these spaces if the filtering operation is left unattended.

It will be appreciated that these prongs 46 may be proportioned and designed such that they will engage the neck of the jug 47 to support the filter assembly 10 on the jug. It will be appreciated that each of the embodiments shown and discussed hereinafter may be provided with such prongs 46.

As stated before, it is extremely important to control the dwell time of the water passing through the filtering medium and particularly through the carbon bed 24. It is desirable, for instance, to have as much dwell time as possible. I presently believe that a dwell time of 5 or 6 or more seconds may be practical as well as desirable for a filter assembly having a carbon bed depth of approximately 1½ inches and a diameter of approximately 2 inches.

My concept is to control the opening of the faucet to which the tube 34 is connected to control the pressure within the space 32. The greater the pressure, the faster the flow rate. The pressure in the space 32 will determine the height to which the water will rise in the stand pipe 36. The score line 40 may be placed such that, when the water rises to the score line, the pressure is at a suitable level, i.e., a level corresponding to the desired flow rate. I presently believe that a head of 8 inches of water in the stand pipe which corresponds to a flow rate of approximately one gallon in 10 or 12 minutes may be quite suitable for the illustrative filter. Thus, the score line 40 may be placed at the 8 inch level. It will be appreciated that the open top 38 of the stand pipe is just a small distance above the score line 40. Thus, if the faucet is opened too much or if there is a line surge, the excessive unfiltered water will be exhausted from the open top 38 to prevent rapid increases in pressure in the space 32. It will be appreciated that such a rapid increase in pressure could greatly increase the flow rate to cause water not properly filtered or completely filtered to be discharged into the jug 47 to be mixed with properly filtered water.

Accounting for line surges is an important feature of my filter assembly. It is well known that such line surges will occur for many and various reasons. That is, a person might make the faucet connection and open the faucet to establish the desired water level in the stand pipe 36. While the jug 47 is being filled, any such line surges will be relieved through the top of the stand pipe, collected in the trough 42 and directed back into the sink and away from the mouth of the jug 47. While the accompanying drawings are not necessarily drawn exactly to scale, the illustrative filter assembly 10 may be constructed in accordance with the size proportions shown in FIG. 1 and FIG. 2, the reference being the filter bed having the 2 inch diameter and the 1½ inch depth. The internal diameter of the stand pipe tube 36 may be, for instance, approximately ⅛ inch while the internal diameter of the feed tube 34 may be as large as, for instance, ⅜ inch. The dimensions of the stand pipe 36, feed tube 34 and space 32 are not really important to the filtering function other than that they must be sufficient to pass the desired amount of water, i.e., flow rate. They must be able to pass one gallon in approximately 10 to 12 minutes, which is believed to be an acceptable flow rate for the filter bed 24.

The idea, therefore, is to adjust the faucet to establish a pressure in the space 32 and stand pipe 36 which will provide the desired flow rate through the filtering medium. The filtering medium will offer a resistance to the flow of water therethrough. This resistance is overcome to extablish the desired flow rate by establishing a head of water in the stand pipe 36. Any excessive pressure which results from water line fluctuations after the faucet is adjusted to the desired level or during the adjustment of the faucet will result in an overflow of water from the top end of the stand pipe.

Turning now to FIG. 3, we see an embodiment differing from the embodiment of FIGS. 1 and 2 in some respects. The filtering assembly of FIG. 3 is indicated generally by the reference numeral 50, and it includes housing portions 52, 54 connected together as indicated at 56. The carbon bed 58 is supported on a lower retainer 60 and an upper prefiltercarbon retainer 62 is provided. The space above the prefilter 62 is indicated generally by the reference numeral 64. This space 64, of course, corresponds to the space 32 in the embodiment of FIG. 1.

A feed tube or inlet tube 66 is shown connected by a tube 70 to a faucent connector 72 which may be conventionally formed to snap onto the mouth of the faucet.

In the illustrative embodiment, an orifice 80 (not necessarily to scale) is provided in a central portion of the upper wall 81 of the housing portion 54, i.e., the upper wall of the space 64. When the water pressure in the space 64 becomes too great, the water flows upwardly through this orifice 80 into a short stand pipe 82. That is, when the water pressure in the space 64 becomes too great, as evidenced by an increase in water height in the space, the water flow upwardly through the orifice 80 into the short standpipe 82. A collector 84 having a discharge outlet tube 86 is placed over the stand pipe 82 to receive any exhausted excessive water and to discharge it through the outlet 86. The outlet 86 may be connected by a flexible tube 88 to the sink associated with the faucet.

In the embodiment of FIG. 3, the orifice 80 is proportioned and designed such that, when the pressure in the space 64 exceeds the pressure corresponding to the desired flow rate through the filter bed 58, the water will pass through the orifice 80 into the small stand pipe 82. Preferably, the cover 84, or at least the top portion thereof, will be at least partially transparent so that the person adjusting the faucet can determine when the pressure is too great. This cover 84, which serves as a collector, may be adhesively bonded or otherwise bonded or securely fastened to the housing portion 54.

The water passing through the filter bed 58 is discharged through an opening 92 into a receptacle. As indicated earlier, prongs such as indicated at 46 in FIG. 1 may be formed on the bottom of the housing portion 52 about the opening 92. Further, clips 94 may be provided for attaching the filter assembly to the side wall of a receptacle.

Figure 4:
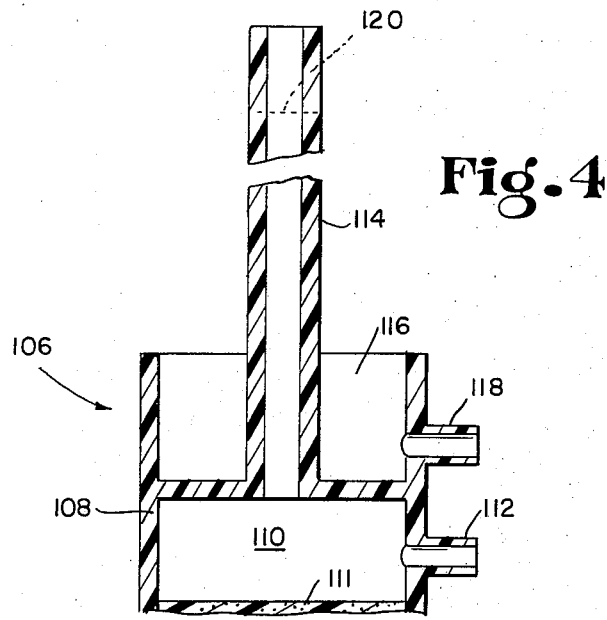
FIGS. 4, 5 and 6 are, respectively, fragmentary sectional views showing different structures for visually indicating when the pressure in the collection space above the filtering medium exceeds the said predetermined level and exhausting water from that space to reduce the pressure to the desired level and/or to maintain it as that level.

Referring now to FIG. 4, a filter assembly indicated generally by the reference numeral 106 will be discussed. The housing 108 of this assembly is proportioned and designed to provide a space 110 above the prefilter and carbon retainer 111 which corresponds to the prefilter 30 (FIG. 1). Water is admitted to the space 110 through the inlet tube 112 which may be connected to a faucet by a flexible tube such as indicated at 70 in FIG. 3. A stand pipe 114 extends upwardly from the central portion of the roof defining the space 110, with the interior of the stand pipe being in communication with the space. The stand pipe 114 is open at the top so that water overflowing from the stand pipe is received in a collector 116 and then directed through a discharge tube 118 back toward the sink. In the illustrative embodiment, the collector 116 is provided by an integrally formed wall portion of the housing 118 which extends peripherally about the base of the stand pipe 114.

For reasons discussed in conjunction with FIG. 1, the stand pipe 114 is provided with a score line 120 as illustrated. Of course, the head of water in the stand pipe 114 will correspond to the pressure in the space 110. If the pressure greatly exceeds the level indicated by the score line 120, water will overflow the stand pipe.

Figure 5:
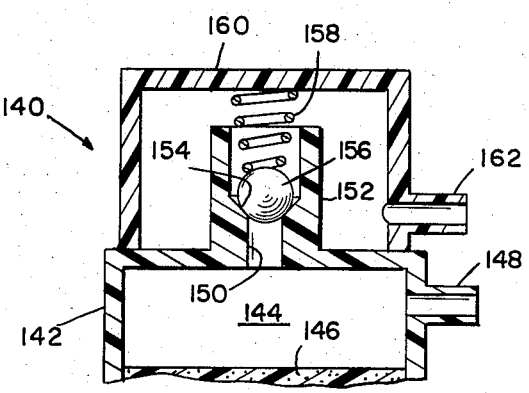

Referring now to FIG. 5, it will be seen that I have illustrated an upper portion of a filter assembly indicated generally by the reference numeral 140. The illustrative filter assembly includes a housing 142 defining a space 144 above the prefilter and carbon retainer 146. Water is admitted to this space through an inlet tube 148. When the presure in this space 144 becomes excessive, the water is exhausted through an exhaust apperture 150 bounded by a short stand pipe 152 providing a concentric conically-shaped valve seat 154. A valve member, such as the ball 156, is provided for conformingly engaging at least a portion of this seat 154 to close the aperture 150. The ball 156 is biased into engagement with the valve seat 154 by means of a calibrated spring 158. When the calibrated force of the spring 158 is overcome by the water pressure in the space 144, water will move past the ball 156 upwardly into the small stand pipe 152. The person controlling the faucet can adjust the faucet until the movement of water past the ball 156 is initially observed. Thus, the valve arrangement of the FIG. 5 structure is a device for visually indicating when the proper pressure in the space 144 has been exceeded.

Water moving past the ball 156 and over the top of the small stand pipe 152 will be collected in a preferably transparent or partially transparent collector cover 160 and then discharged through a discharge tube indicated at 162.

The theory of the embodiment of FIG. 5, therefore, is that the faucet is adjusted until there is a slight amount of drippage past the ball valve member 156 which establishes the proper pressure for the proper flow rate. Any line surges increasing the pressure will, therefore, be relieved by means of the ball valve.

Figure 6:
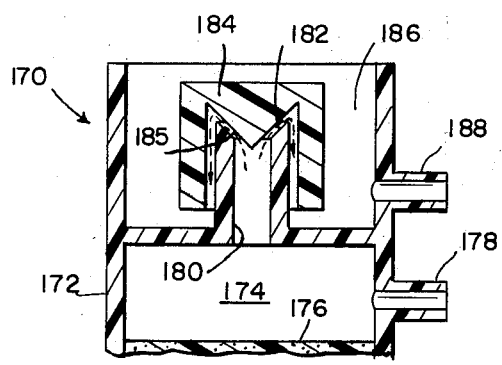

Referring now to FIG. 6, another embodiment indicated generally by the reference numeral 170 and including the housing 172 defining a space 174 above the prefilter and carbon retainer element 176 will be discussed. Water is admitted into the space 174 through the inlet tube 178. A small stand pipe extends upwardly from the roof of the space 174 with the interior 180 of the stand pipe being in communication with the space 174. The upper portion of the stand pipe is formed to provide a concentrically disposed, conically shaped seat 182. A weighted valve member 184 having a portion 185 which is conically shaped conformingly to fit the seat 182 is provided. This valve member fits on the small stand pipe such that, when the water pressure in the space 174 exceeds the predetermined desired level, the member 184 is lifted to permit the passage of water over the valve seat 182 as indicated by the arrows. As discussed in conjunction with FIG. 5, the faucet to which the inlet tube 178 is connected can be opened until a slight drippage of water into the bottom of the collector 186 is observed. A discharge tube 188 leads away from the collector 186.

It wibl be appreciated that each of the embodiments discussed thus far includes a pressure-responsive means for visually indicating when the pressure which determines the flow rate exceeds the desired level, the pressure-responsive means being proportioned and designed to exhaust the excessive unfiltered water away from the filter assembly to reduce and/or maintain the water pressure therein. In each case, care is taken to exhaust the unfiltered water in such a manner that it will not be mixed with the filtered water. Further, care is taken such that the pressure-responsive means acts quickly to prevent sudden increases in pressure which will suddenly increase the flow rate to discharge only partially treated water into the water collection receptacle.

Referring now to FIG. 7, another embodiment of my present invention will be discussed, this embodiment being indicated generally by the reference numeral 200 and including a housing portion 202 formed generally in the same manner as the housing portion 14 in FIG. 1. A carbon bed 204 is supported on a carbon retainer 206 and covered by a prefiltered and carbon retainer 208. Water is discharged through a discharge opening 210 in the discharge end portion. The inlet end portion includes a cover 212 formed with a plurality of apertures 214 through which the water moves to pass through the prefilter 208. In the illustrative embodiment, a peripherally extending O-ring seal 216 is captured between the cover 212 and the upper edge of the housing portion 202. A removable receptacle 218 is provided, the lower portion 220 of the receptacle 218 being engageable with the seal 216. The open-topped receptacle 218 is provided for receiving the water to be filtered. The height of the receptacle 218 establishes the maximum head of water pressure which determines the flow rate through the filtering medium including the filter bed 204.

In the illustrative embodiment, the receptacle 218 is detachable from the housing 202 to reduce the overall size of the filter assembly 200 for packaging and shipping purposes. In fact, the housing 202 may be placed within the receptacle 218 for packaging and shipping.

The filter assembly may be placed under a faucet with the discharge end port 210 directed toward, for instance, the mouth of a jug or pitcher. Then, the faucet may be adjusted such that the receptacle 218 is maintained at least partially filled to provide a source of water to be filtered. A score line, such as indicated at 221, may be provided for establishing a reference level for use in adjusting the faucet. Of course, any surges from the faucet will merely result in overflow of the receptacle 218 into the sink.

It will also be appreciated that the filter assembly 200 may well be used to filter small quantities of water as desired. For instnace, one glass full of water at a time may be dumped into the receptacle 218 to be filtered. The receptacle 218, for instance, may be of a size sufficient to hold 10 ounces of water to be filtered.

Referring to FIG. 7a, like reference numerals representing like parts, it will be seen that the receptacle 218' is an integrally-formed part of the housing 202'. In other words, the receptacle 218' is not removable as is the case with the structure of FIG. 7. The divider member 212' providing the apertures 214' may be ultrasonically bonded or otherwise attached to the housing as indicated at 226. The advantage of the structure of FIG. 7a, of course, is that the receptacle portion 218' can be integrally formed with the housing portion 202' in a two-part mold.

Turning now to FIG. 8, another embodiment indicated generally by the reference numeral 230 will be discussed, this embodiment including a filter element portion 232 and a receptacle portion 234. The filter element portion 232 includes a housing 236 enclosing the carbon bed 238 which rests upon the carton retainer 240 and which is covered by the prefilter and carbon retainer 242. The upper portion of the housing 236 is connected to a fitting 244 as indicated at 245. The fitting 244 includes a web portion 243 and a plurality of radially and downwardly extending ribs 243a which engage and compress the prefilter 242. This portion 243 is also formed with a centrally located flow control orifice 243b. The illustrative fitting 244 is formed with male threads which threadedly engage female threads formed in the fitting portion 246 of the receptacle 234. A sealing ring 248 may be provided as illustrated.

It will be appreciated that the receptacle 234 is a generally cylindrically shaped receptacle with the cylindrical wall thereof being accordion pleated so that the receptacle is axially compressible or collapsible. When the receptacle is filled with water to be filtered and the filter element 232 is threaded into the fitting 246, water can be forced through the filter bed 238 to be discharged through the discharge outlet 250. Manual collapsing of the container 234 creates the required water pressure in the space 252 above the prefilter 242.

My tests to date have shown that the flow rate through the 1½ inch deep carbon bed 238 is approximately one pint per minute. The receptacle 234 I have used holds a little over a pint of water. This flow rate corresponds to a rate of approximately one gallon of water in eight minutes.

If more retention time is desired, a slower flow rate may be achieved by increasing the thickness (depth) of the carbon bed 238, reducing the size of the outlet opening 250, or reducing the size of the flow control orifice 243b. It will be appreciated that all three of these methods will increase the total resistance to the flow of water, thereby effecting a reduced flow rate. I have found that the pressure generated in the squeezing or collapsing of the container 234 will be fairly constant for normal persons exerting a normal squeezing force.

Within the scope of my present invention, the accordion-pleated receptacle 234 may be replaced by several different types of collapsible containers such as, for instance, a plastic bag with a suitable fitting for engaging the filter element 232.

I believe that my filter assembly 230 or its equivalent is ideally suited for use by soldiers in the field who desire to make their water which has been treated with chlorine tablets more palatable. For instance, the discharge end portion of the filter element 232 could be threaded to be attached to a canteen.

What is claimed is:

1. A portable disposable water filter for use with an adjustable flow faucet including a delivery port and a manually adjustable control valve, said filter comprising housing means having an inlet end portion and an opposite discharge end portion, filtering medium disposed between said end portions and through which the water must pass in movement from said inlet end portion to said discharge end portion, said filtering medium having a proper water treating effect when the flow rate therethrough is at a desired level, said inlet end portion being formed to provide a space for receiving water to be filtered, standpipe means for visually indicating when the water pressure in said space is at a predetermined level corresponding to the desired flow rate through said medium, said standpipe means communicating with said space such that the water level in said standpipe means is a function of the water pressure in said space, standpipe means being disposed to discharge excessive unfiltered water away from said space such that said excessive unfiltered water does not mix with the filtered water discharged from said discharge end portion and conduit means for connecting said space to such a water faucet delivery port whereby the flow of water into said space to develop said predetermined pressure level can be achieved by manually adjusting such faucet valve.

2. The invention of claim 1 in which said standpipe means has an open top such that, when the pressure in said space is excessive, excessive unfiltered water is exhausted away from said space through said open top.

3. The invention of claim 2 including collector means for receiving water exhausted from said open top.

4. The invention of claim 3 in which said collector means is proportioned and designed to direct such exhausted water toward the sink associated with such a faucet.

5. The invention of claim 1 in which said standpipe means is at least partially transparent so that the level of water therein can be seen.

6. The invention of claim 5 in which said standpipe means is provided with sight indicia means disposed at a level corresponding to the water level therein at said predetermined pressure level.

7. The invention of claim 1 in which said inlet end portion is formed with an upper wall, said standpipe means extending upwardly from said upper wall to provide said visual indicating means.

8. The invention of claim 7 in which said inlet end portion is formed with an upstanding wall extending about said standpipe means to provide a collector for the overflow from the top thereof said standpipe means having an open top.

9. The invention of claim 1 in which said conduit means includes said standpipe means in communication with said space.

10. The invention of claim 9 in which said standpipe means is at least partially transparent so that the level of water therein can be seen.

11. The invention of claim 9 in which said standpipe means has an open top, and including collector means for receiving water exhausted from said open top.

12. A water filter for use with an adjustable flow faucet, said filter comprising housing means having an inlet end portion and a discharge end portion, filtering medium disposed between said end portions and through which the water must pass in movement from said inlet end portion to said discharge end portion, said filtering medium having a proper water treating effect when the flow rate therethrough is at a desired level, said inlet end portion being formed to provide a space for receiving water to be filtered, said housing means being formed to provide a second space, and means for exhausting excessive water from said first mentioned space to said second space to reduce the water pressure in said first mentioned space to a predetermined level, said exhausting means being disposed so that such exhausted excessive water is not mixed with the filtered water discharged from said discharge end portion, said exhausting means including pressure responsive means for visually indicating when the pressure in said first mentioned space exceeds said predetermined level, whereby the flow of water into said first mentioned space to develop said predetermined pressure level can be achieved by manually adjusting such faucet valve.

13. The filter of claim 12 in which said pressure responsive means includes valve means, said valve means including means providing an exhaust aperture and a valve seat bounding said aperture, and a valve member proportioned and designed conformingly to engage said seat to close said aperture, said member being yieldably biased into engagement with said seat.

14. The filter of claim 12 in which said visual indicating means includes standpipe means communicating with said first mentioned space such that the water level in said standpipe means is a function of the water pressure in said space.

* * * * *

UNITED STATES PATENT OFFICE
CERTIFICATE OF CORRECTION

Patent No. 3,823,824　　　　　　　　　　Dated July 16, 1974

Inventor(s)　Sam Close

It is certified that error appears in the above-identified patent and that said Letters Patent are hereby corrected as shown below:

Column 2, line 33, "hug" should be -- jug --; line 46, "as" should be -- at --.
　　　Column 3, line 31, correct the spelling of -- done --; line 38, correct the spelling of -- disposed --; line 45 should read -- ter material may be, for instance, a foam plas- --.
　　　Column 5, line 23, correct the spelling of -- fluctuations -- line 40, correct the spelling of -- faucet --; line 51, "flow" should be -- flows --.
　　　Column 7, line 25, correct the spelling of -- will --; line 46, "prefiltered" should be -- prefilter --.
　　　Column 8, line 13, correct the spelling of -- instance --.
　　　Column 9, line 35 (Claim 1, line 18), after the comma, and before "standpipe" insert -- said --.
　　　Column 10, line 10 (Claim 8, line 4), insert a comma after "thereof" and before "said".

Signed and sealed this 29th day of October 1974.

(SEAL)
Attest:

McCOY M. GIBSON JR.　　　　　　　　C. MARSHALL DANN
Attesting Officer　　　　　　　　　　Commissioner of Patents